United States Patent
Lu (10) Patent No.: US 11,244,020 B2
(45) Date of Patent: Feb. 8, 2022

(54) METHOD AND DEVICE FOR CHINESE CONCEPT EMBEDDING GENERATION BASED ON WIKIPEDIA LINK STRUCTURE

(71) Applicant: QILU UNIVERSITY OF TECHNOLOGY, Shandong (CN)

(72) Inventor: Wenpeng Lu, Jinan (CN)

(73) Assignee: QILU UNIVERSITY OF TECHNOLOGY, Jinan (CN)

( * ) Notice: Subject to any disclaimer, the term of this patent is extended or adjusted under 35 U.S.C. 154(b) by 77 days.

(21) Appl. No.: 16/764,732

(22) PCT Filed: Oct. 26, 2018

(86) PCT No.: PCT/CN2018/112121
§ 371 (c)(1),
(2) Date: May 15, 2020

(87) PCT Pub. No.: WO2019/119967
PCT Pub. Date: Jun. 27, 2019

(65) Prior Publication Data
US 2021/0073307 A1    Mar. 11, 2021

(30) Foreign Application Priority Data

Dec. 22, 2017  (CN) .......................... 201711404733.1

(51) Int. Cl.
*G06F 16/955* (2019.01)
*G06F 16/81* (2019.01)
(Continued)

(52) U.S. Cl.
CPC .......... *G06F 16/9558* (2019.01); *G06F 16/81* (2019.01); *G06F 16/9562* (2019.01);
(Continued)

(58) Field of Classification Search
CPC .. G06F 16/9558; G06F 16/81; G06F 16/9562; G06F 40/53; G06F 17/30011;
(Continued)

(56) References Cited

U.S. PATENT DOCUMENTS

2008/0004864 A1   1/2008  Gabrilovich et al.
2018/0165554 A1*  6/2018  Zhang .................. G06K 9/6256

FOREIGN PATENT DOCUMENTS

CN   106844413 A   6/2017
CN   107102983 A   8/2017
(Continued)

OTHER PUBLICATIONS

Sherkat et al., "NPL" ("Vector Embedding of Wikipedia Concepts and Entities" Published Jun. 2, 2017—Total 17 pages (Year: 2017).*
(Continued)

*Primary Examiner* — Quoc A Tran
(74) *Attorney, Agent, or Firm* — Oliff PLC (57) ABSTRACT

A method and a device for Chinese concept embedding generation based on Wikipedia link structure includes: Step (1): According to the title concepts and/or link concepts in Chinese Wikipedia pages, a link information database is constructed; Step (2): For the title concepts, according to their link relationships with link concepts in the link information database, the positive and negative training instances are constructed respectively, which constitute the training dataset; Step (3): A concept embedding model is built, including an input layer, an embedding layer, a computational operation layer, and an output layer; Step (4): The concept embedding model is trained with the training dataset, then, the Chinese concept embedding is extracted/generated from the concept embedding model. The method can accurately distinguish different concepts and overcome the problem of polysemy that troubles the traditional embed-
(Continued)

ding methods, which is beneficial to generate more accurate concept embedding representation.

18 Claims, 1 Drawing Sheet

(51) Int. Cl.
| | |
|---|---|
| *G06F 40/53* | (2020.01) |
| *G06N 20/00* | (2019.01) |
| *G06F 40/284* | (2020.01) |
| *G06F 40/247* | (2020.01) |
| *G06F 40/30* | (2020.01) |
| *G06F 40/216* | (2020.01) |
| *G06N 3/04* | (2006.01) |
| *G06N 3/08* | (2006.01) |
| *G06F 40/134* | (2020.01) |
| *G06F 16/958* | (2019.01) |
| *G06N 5/02* | (2006.01) |
| *G06N 20/10* | (2019.01) |
| *G06F 40/205* | (2020.01) |
| *G06F 40/166* | (2020.01) |
| *G06Q 10/10* | (2012.01) |
| *G06F 17/00* | (2019.01) |

(52) U.S. Cl.
CPC ............ *G06F 40/53* (2020.01); *G06F 16/958* (2019.01); *G06F 40/134* (2020.01); *G06F 40/166* (2020.01); *G06F 40/205* (2020.01); *G06F 40/216* (2020.01); *G06F 40/247* (2020.01); *G06F 40/284* (2020.01); *G06F 40/30* (2020.01); *G06N 3/0454* (2013.01); *G06N 3/0481* (2013.01); *G06N 3/08* (2013.01); *G06N 5/022* (2013.01); *G06N 20/00* (2019.01); *G06N 20/10* (2019.01); *G06Q 10/10* (2013.01)

(58) Field of Classification Search
CPC ......... G06F 17/30864; G06F 17/30675; G06F 17/274; G06F 17/277; G06F 17/2785; G06F 40/134; G06F 40/216; G06F 40/284; G06F 40/247; G06F 40/30; G06F 16/958; G06F 40/205; G06F 40/166; G06F 17/30277; G06N 20/00; G06N 5/022; G06N 3/0454; G06N 3/0481; G06N 3/08; G06N 20/10; G06N 5/046; G06K 9/66; G06K 9/6276; G06K 9/6262; G06Q 10/10

See application file for complete search history.

(56) References Cited

FOREIGN PATENT DOCUMENTS

| | | |
|---|---|---|
| CN | 107491524 A | 12/2017 |
| CN | 108132928 A | 6/2018 |
| CN | 108153853 A | 6/2018 |

OTHER PUBLICATIONS

Jan. 24, 2019 International Search Report issued in International Patent Application No. PCT/CN2018/112121.
Jan. 24, 2019 Written Opinion issued in International Patent Application No. PCT/CN2018/112121.
Feb. 10, 2020 Office Action issued in Australian Patent Application No. 2018388932.
"Getting Started With the Keras Functional API". Keras Documentation [retrieved Feb. 6, 2020], <URL: https://web.archive.org/web/20171109163729/https://keras.io/getting-started/functional-api-guide/> published Nov. 9, 2017.

* cited by examiner

METHOD AND DEVICE FOR CHINESE CONCEPT EMBEDDING GENERATION BASED ON WIKIPEDIA LINK STRUCTURE

TECHNICAL FIELD

The present invention relates to the field of natural language processing, and in particular to a method and a device for Chinese concept embedding generation based on Wikipedia link structure.

BACKGROUND OF THE INVENTION

Currently, Wikipedia is the largest encyclopedia in the world. It is not only a large corpus, but also a knowledge base containing abundant human background knowledge and semantic relationships. It is an ideal resource for natural language processing.

The semantic representation of the concept of words is a fundamental issue in the field of natural language processing. Traditional methods can be divided into count-based methods and prediction-based methods. The former, firstly, counts the co-occurrence information of the words, and learns word embeddings by decomposing the co-occurrence matrix; the latter learns the word embeddings by predicting the co-occurrence word in a given context. Both of these methods essentially learn the embedding representation of the word concept by mining the co-occurrence information of the words contained in the corpus. The current popular Word2Vec method belongs to the latter.

In natural language texts, there is a widespread problem of polysemy, especially in Chinese language. However, the existing methods for learning word representation usually distinguish words based on the word form, which fail to distinguish the concepts/meanings corresponding to the words. For a word, only a unified embedding representation can be learned. However, this word may correspond to multiple word meaning concepts. Obviously, the exiting methods confuse all of the concepts of a word together, which cannot accurately distinguish the meaning concepts of a word.

In summary, the existing methods for learning embedding representation cannot distinguish the concepts of the word in essence, and there is still no effective solution in Chinese language.

STATEMENT OF INVENTION

Aiming at the deficiencies in the existing methods, in order to solve the problem that the existing methods fail to distinguish the concepts of words, the present invention proposes a method and a device for Chinese concept embedding generation based on Wikipedia link structure. The invention solves the construction problem of Wikipedia link information database, presents the method to construct training dataset of concept embeddings, puts forward the training model and training method for concept embeddings, and gives the method to return the concept embedding matrix.

The first purpose of the present invention is to provide a method for Chinese concept embedding generation based on Wikipedia link structure.

In order to achieve the above purpose, the present invention provide the following technical solution, i.e., a method for Chinese concept embedding generation based on Wikipedia link structure, which includes:

According to the title concepts and/or link concepts in Chinese Wikipedia pages, a link information database is constructed;

For the title concepts, according to their link relationships with link concepts in the link information database, the positive and negative training instances are constructed respectively, which constitute the training dataset;

A concept embedding model is built, including an input layer, an embedding layer, a computational operation layer, and an output layer;

The concept embedding model is trained with the training dataset, then, the Chinese concept embedding is extracted/generated from the concept embedding model.

Further, as a preferred solution, the present invention provides the method to construct the link information database, which is built according to the description and category information combing the title concepts and/or link concepts in Chinese Wikipedia pages.

Further, as a preferred solution, the detailed method for constructing the link information database is as follows:

An original Chinese Wikipedia page is pre-processed to only reserve its valid text data;

From the valid text data in a Wikipedia page, the co-occurrence frequencies of title concept with its link concepts or category links in current Wikipedia page are counted;

The co-occurrence frequency information in all Wikipedia pages is merged together to construct a link information database;

According to the link information database, for each title concept, link concept or category link, its total frequency is counted.

Further, as a preferred solution, the detailed method for pre-processing the original Chinese Wikipedia page is as follows:

The invalid information in the original Chinese Wikipedia pages are filtered out to get the valid text data, only reserving the title concepts, the main descriptive text, link concepts and category links;

The traditional Chinese characters are converted to simplified Chinese characters.

Further, as a preferred solution, the detailed method for handling the positive and negative training instances is as follows:

The title concept of a Chinese Wikipedia page and a link concept or category link in the Wikipedia page, are combined together to form a positive training instance;

The title concept of a Chinese Wikipedia page and a link concept or category link not in the Wikipedia page, are combined together to form a negative training instance.

Further, as a preferred solution, the detailed method for constructing the training dataset is as follows:

The positive and negative training instances are merged together to form the candidate training dataset;

From the candidate training dataset, the methods to select a number of positive and negative instances, including two strategies: (1) selection based on the frequencies of concepts, and (2) random selection;

The order of selected instances are randomized to construct the training dataset.

Further, as a preferred solution, the detailed method for realizing the selection based on the frequencies of concepts is as follows:

According to the frequencies that link concepts or category links emerge in Wikipedia pages or corpus, their selection probabilities are computed;

According to the selection probabilities, the training instances are chosen from the candidate training dataset.

Further, as a preferred solution, the detailed method for building the concept embedding model is as follows:

According to the descending order of the frequencies of title concepts, link concepts and category links in Wikipedia corpus, all the concepts are encoded with an ID number;

With the total number of title concepts, link concepts and category links as one dimension and the width length of a target concept embedding as another dimension, a two-axis matrix is constructed and initialized with the uniform distribution on [−1,1], which is the concept embedding matrix and is taken as weight matrix of the embedding layer in the concept embedding model;

The concept embedding model consists of input layer, embedding layer, computational operation layer and output layer; the two concepts in each training instance are taken as the two input of the input layer; the embedding layer converts the two input concepts to their concept embedding representations; the computational operation layer does the concatenation, multiplication or other operations on the two concept embeddings, to generate an embedding representation for current training instance; according to the embedding representation of current training instance, the output layer classifies the current instance and judge whether it is positive or negative.

Further, as a preferred solution, the detailed method for acquiring the concept embeddings is as follows:

After the concept embedding model is trained on the training dataset, the optimized weight parameters in the embedding layer of the model are extracted, which form the generated concept embedding matrix, whose rows are corresponding with the concepts.

The second purpose of the present invention is to provide a computer readable storage medium.

In order to achieve the above purpose, the present invention adopts the following technical solution, described as:

A computer readable storage medium stores a series of instructions. The instructions are loaded by a processor of a terminal device, which performs the following processing:

According to the title concepts and/or link concepts in the Chinese Wikipedia page, a link information database is constructed;

For the title concepts, according to their link relationships with link concepts in the link information database, the positive and negative training instances are constructed respectively, which constitute the training dataset;

A concept embedding model is built, including an input layer, an embedding layer, a computational operation layer, and an output layer;

The concept embedding model is trained with the training dataset, then, the Chinese concept embedding is extracted/generated from the concept embedding model.

The third purpose of the present invention is to provide a terminal device.

In order to achieve the above purpose, the present invention adopts the following technical solution, described as:

A terminal device is composed with a processor and a computer readable storage medium. The processor is used to implement instructions. The computer readable storage medium is used to stores a series of instructions. The instructions are loaded by a processor of a terminal device, which performs the following processing:

According to the title concepts and/or link concepts in the Chinese Wikipedia page, a link information database is constructed;

For the title concepts, according to their link relationships with link concepts in the link information database, the positive and negative training instances are constructed respectively, which constitute the training dataset;

A concept embedding model is built, including an input layer, an embedding layer, a computational operation layer, and an output layer;

The concept embedding model is trained with the training dataset, then, the Chinese concept embedding is extracted/generated from the concept embedding model.

The beneficial effects of the invention are as follows:

1. The method and device for Chinese concept embedding generation based on Wikipedia link structure described in the present invention, can effectively pre-process Chinese Wikipedia corpus, extract concepts and their link relationships, and construct a link information database.

2. The method and device for Chinese concept embedding generation based on Wikipedia link structure described in the present invention, can handle the construction and selection of positive and negative training instances to generate training datasets. Besides, the invention defines and implements a complete model for training concept embedding, which can generate the final concept embedding representation.

3. The method and device for Chinese concept embedding generation based on Wikipedia link structure described in the present invention, can generate the final concept embedding with title concepts and/or link concepts in Chinese Wikipedia pages. It can accurately distinguish different concepts and overcome the problem of polysemy that troubles the traditional embedding methods, which is beneficial to generate more accurate concept embedding representation.

BRIEF DESCRIPTION OF THE DRAWINGS

The accompanying drawings, which are incorporated in the claims of the invention.

DETAILED DESCRIPTION OF THE INVENTION

In order to help the skilled technicians in the field to understand the solution of the present invention, the embodiments will be illustrated in detail, which is combined with the drawings. Obviously, the described embodiments are only a part of the embodiments of the invention, instead of all of the embodiments. All other embodiments obtained by those skilled in the field based on the embodiments of the present invention without creative efforts are within the scope of the present invention.

It should be noted that the following detailed description is illustrative, which is used to provide a further description of the application. Except for the cases that are specially explained, all technical and scientific terms used in this embodiment have the same meaning as commonly understood by the technicians in the filed.

It is to be noted that the terminologies in this document is for the purpose of describing particular embodiments, which should not be used to limit the exemplary embodiments. As in this document, expect for the cases that are specially explained, the singular form is intended to include the plural form. Besides, the terminology "and/or" means that the mentioned features, steps, operations, devices, components are used separately or combined together.

It is noted that the flowchart and block diagrams illustrate the possible architecture, functionality, and operation in the embodiments of the present invention disclosure. It should be noted that each block of the flowchart or diagram may represent a module, a program segment, or a portion of codes, which may include one or more executable instructions for implementing specified logical functions in various embodiments. It should also be noted that in some alternative embodiments, the functions noted in the blocks may also occur in a different order. For example, two successive blocks may be executed in parallel, or they can sometimes be executed in the reverse order. The detailed order depends upon its functionality. It should also be noted that each block of the flowcharts and/or block diagrams, and combinations of blocks in the flowcharts and/or block diagrams can be implemented with a dedicated hardware-based system or can be implemented with a combination of dedicated hardware and computer instructions.

Explanation of terms: It should be noted that the concept described in the present invention refers to the title concept of a Wikipedia page and the link concepts contained in a Wikipedia page. For the wiki page "微博" ("Weibo") (https://zh.wikipedia.org/wiki/weibo), it is used to describe the concept "微博"; "微博" is called the "title concept" of the current wiki page. For each wiki page, Wikipedia utilizes abundant descriptive text to describe the title concept. In these descriptive texts, a number of other link concepts are referenced. For example, in the first paragraph of the wiki page corresponding to the concept "微博", there is a sentence "微博(英语: microblog) 是一种允许用户即时更新简短文本 (通常少于 Twitter 開始的 140 字) 并可以公开发布的 是一种允许用户", its corresponding source code is: "'微博' ({{lang-en|'microblog'}}) 微型博客形式。即时更新简短文本 (通常少于 [[Twitter]]開始的 140 字) 并可以公开发布的 微型 [[網誌|博客]]形式. Among the source code, "Twitter" and "網誌" in double brackets indicate references to other concepts (hyperlinks). Each of them is corresponding to a wiki concept, which is called the "link concept" in the current wiki page.

"alternative word" refers to a word that is displayed in a wiki page, which substitute and represent a link concept. For example, in [[網誌|博客]], "博客" is a alternative word for "網誌". "博客" will appear in the wiki page, but its link concept points to "網誌".

"category link" refers to the category which the wiki concept page belongs to. For example, "[[Category: 微博客]]" indicates that the title concept of the current wiki page belongs to "Category: 微博客".

When there is not any conflict, the embodiments in the present invention and the features in the embodiments may be combined with each other. The existing word embedding methods fail to solve the problem of distinguishing the difference concepts of words. Aiming at the deficiency, the present invention proposes a method and a device for Chinese concept embedding generation based on Wikipedia link structure, which solves the construction problem of link information database, presents the method to construct training dataset of concept embeddings, puts forward the training model and training method for concept embeddings, and gives the method to return the concept embedding matrix. With the help of the drawings and embodiments, the invention will be further described as follows.

Embodiment 1

In order to accurately learn the embedding representation of the concept, it is necessary to construct training dataset with the concept as an object. Wikipedia has a large number of concept annotations, and these concept annotations have rich semantic link relationships. This makes Wikipedia be suitable to construct training dataset for concept embeddings.

Figure 1:
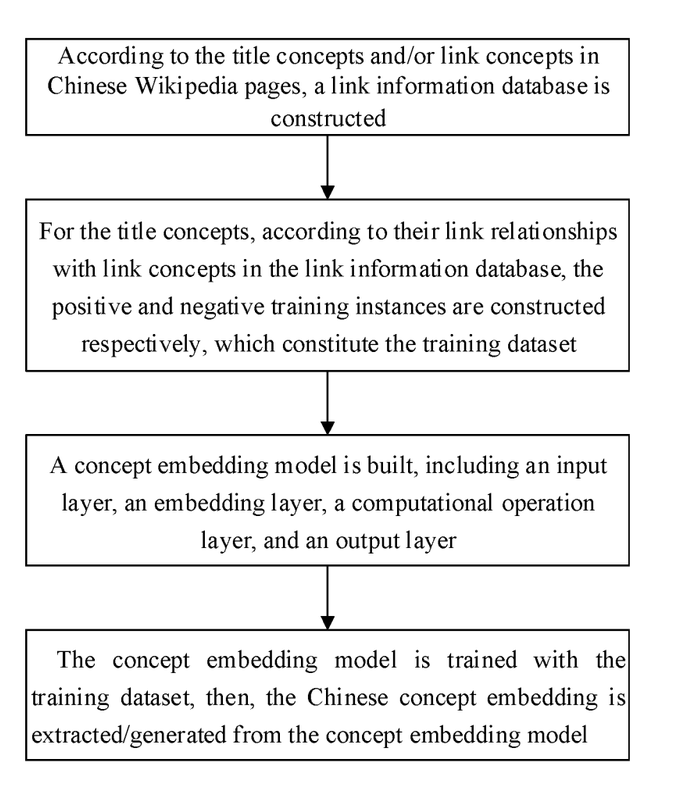
FIG. 1 is the flowchart of the method for Chinese concept embedding generation based on Wikipedia link structure described in the invention.

The purpose of the first embodiment is to provide a method for Chinese concept embedding generation based on Wikipedia link structure In order to achieve the above object, the present invention adopts the following technical solution:

As shown in FIG. 1, a method for Chinese concept embedding generation based on Wikipedia link structure includes:

Step (1): According to the title concepts and/or link concepts in Chinese Wikipedia pages, a link information database is constructed;

Step (2): For the title concepts, according to their link relationships with link concepts in the link information database, the positive and negative training instances are constructed respectively, which constitute the training dataset;

Step (3): A concept embedding model is built, including an input layer, an embedding layer, a computational operation layer, and an output layer;

Step (4): The concept embedding model is trained with the training dataset, then, the Chinese concept embedding is extracted/generated from the concept embedding model.

In this embodiment, according to the detailed Wikipedia page information, the method is described.

Step (1): Construct a Wikipedia link information database. In this embodiment, the specific method for constructing the link information database is:

Step (1-1): pre-processing the original Chinese Wikipedia page to obtain the valid text data.

Download Wikipedia's Dump file and pre-process it, including removing useless information and xml tags, and performing the conversion from traditional Chinese characters to simplified ones. For each wiki page, only its title concept, the main descriptive text, link concepts and category links are retained.

The specific steps of the pre-processing of the original Chinese Wikipedia page include:

Step (1-1-1): The invalid information in the original Chinese Wikipedia pages are filtered out to get the valid text data, only reserving the title concepts, the main descriptive text, link concepts and category links.

The original page contains abundant useless information, we only reserve the content contained in <title> mark and <text> mark, including title concept, the main descriptive text, link concepts and category links. For the data contained in <text> tags, we remove all formation marks, remove all special encodings; remove all reference citation marks, remove all data in "注釋" (注释), "參考文獻", (参考文献), "外部連結", (外部连接), "參見" (参见) sections, and remove all data in double braces "{{" and "}}".

For example, suppose the content of the original wiki page corresponding to "微博" is as follows:

```

<title>微博</title>
<ns>0</ns>
<id>621241</id>
<revision>
<id>44393586</id>
<parentid>44393498</parentid>
<timestamp>2017-05-17T12:01:53Z</timestamp>
```

```
<contributor>
<username>想用的名稱都被用了</username>
<id>2379959</id>
</contributor>
<comment>/* 其它 */</comment>
<model>wikitext</model>
<format>text/x-wiki</format>
<text xml:space="preserve">{{ 不是 新浪微博 }}
{{NoteTA
|1=zh-hans:博客; zh-hant:博客; zh-hk: 網誌; zh-tw:部落格;
|2=zh-hans:录像; zh-hant: 錄影;
|G1=IT
}}
'''微博''' ({{lang-en|''microblog''}})是一种允许用户即时更新简短文本
(通常少于
[[Twitter]]開始的 140字 ),并可以公开发布的微型 [网誌 博客]]形式.
它允许任何人阅读
或者只能由用户选择的群组阅读。随著發展,這些訊息可以
被很多方式傳送,包括[[短
訊 ]]、[[ 即時訊息軟體 ]]、[[行動應用程式 ]]、[[電子郵件]]或[[網頁]]。
一些微博也可以
發佈[[多媒體]],如圖片或影音剪 輯和出版。
微博的代表性网站是[[ Twitter]]、[[ 新浪微博]] 利 [Plurk]] ,而 Twitter
甚至已经成为了 微博的代名词。
微博是一种博客。
{{Internet}}
== 服務 ==
=== 社交机器人 ===
活跃在微博客上的用户并非全 是真实的人物,也有代码伪装成
人的[[社交机器人]]。
<ref>http://www.mittrchinese.com/single.php?p=172475
"社交机器人":促进人 与人
的联系 </ref>.
== 參考資料 ==
{{reflist}}
== 外部連結 ==
* 趙鼎新: [http://www.aisixiang.com/data/52739.html《微博、
政治公共空間和中國的發展》] (2012)
*[http://xirang.us/2009/11/top-opensource-microblogging-platfroms
优秀的开源免费微博客建站程序大放送]
{{Microblogging}}
{{Authority control}}
[[Category: 網誌]]
[[Category:微博客]]</text>
<sha1>3mxpoiw0iabn7nk9dxgs10by1y54dfl</sha1>
</revision>

```

After the useless information in the above Wikipedia page are filtered out, the reserved valid text is as follows:

<title>微博</title>

微博( ) 是一种允许用户 即时更新简短文本 (通常少于 [[Twitter]] 開始的 140 字 ) 并可 以公开发布的微型 [[網誌 博客]]形式。 它允许任何人 阅读或者 即时訊息軟體 选择的群组阅 读。随著發展, 這些訊息可以 被很多方式傳送, 包括[[短訊 ]]、 [[只能由用戶 ]]、 [[行動應用程式]]、 [[電子郵件]]或[[網頁]]。一些微博也可以 發佈[[多媒體]], 如圖片或影音剪 輯和出版。

微博的代表性 网站是 [[Twitter]]、 [[新浪微博]] 和 [[Plurk]], 而 Twitter 甚至已经成为了 微博的代名词。

微博是一种博客。

服務

社交机器人

活跃在微博客上 的用户并非全 是真实的人物,, 也有代码伪装成人 的[[社交机器人]]。

[[Category: 網誌]]

[[Category: 微博客]]

Step (1-1-2): The traditional Chinese characters are converted to simplified Chinese characters.

Because there are a large number of traditional Chinese characters in Chinese Wikipedia, they are uniformly converted into simplified Chinese characters.

For example, this conversion process can be handled by Chinese simplified conversion tool "opencc". After the conversion, the above example becomes as follows:

<title>微博</title>

微博( ) 是一种允许用户 即时更新简短文本 (通常少于 [[Twitter]] 开始的 140 字 ) 并可 以公开发布的微型 [[ [[网志|博客]] ]]形式。 它允许任何人 阅读或者只能由 用户选择的群组阅 读。随着发展, 这些讯息可以被 很多方式传送, 包括[[短讯]]、 [[即时消息软件]]、 [[行动应用程序]]、 [[电子邮件]]或[[网页]]。 一些微博也可以发布 [[多媒体]], 辑和出版。

微博的代表性 网站是 [[Twitter]], [[新浪微博]] 和 [[Plurk]], 而 Twitter 甚至已经成为了 微博的代名词。

微博是一种博客。

服务

社交机器人

活跃在微博客上 的用户并非全 是真实的人物, 也有代码伪装成人 的[[社交机器人]]。

[[Category: 网志]]

[[Category: 微博客]]

Step (1-2): From the valid text data in a Wikipedia page, the co-occurrence frequencies of title concept with its link concepts or category links in current Wikipedia page are counted.

For each wiki page, the frequencies of title concept, link concepts and category links are counted.

For example,

In the above example, the title concept is "微博", the link concepts are: [[Twitter]], [[网志|博客]], [[短讯]], [[即时消息软件]], [[行动应用程序]], [[电子邮件]], [[网页]], [[多媒体]], [[新浪微博]], [[Plurk]], and category links are: [[Category: 网志]], [[Category: 微博客]].

Among them, for the title concept "微博", its frequency in the valid text data is 9. For the link concept "Twitter", its frequency is 3. For the link concept "网志", its co-occurring frequency with its alternative word "博客" is 1, and its frequency is 1 by itself, and its alternative word "博客" appears 3 times separately. Therefore, the frequency of the link concept "网志" is recorded as 5. Similarly, the frequencies of other link concepts are counted. For category link, its frequency is usually 1. The statistical data is shown in Table 1.

TABLE 1

Co-occurrence frequencies of title concept with its link concepts or category links in the Wikipedia page "微博"

| Title concept/link concept/category link | Co-occurrence frequencies |
| --- | --- |
| 微博 | 9 |
| Twitter | 3 |
| 网志 | 5 |
| 短讯 | 1 |
| 即时消息软件 | 1 |
| 行动应用程序 | 1 |
| 电子邮件 | 1 |
| 网页 | 1 |
| 多媒体 | 1 |
| 新浪微博 | 1 |
| Plurk | 1 |
| Category: 网志 | 1 |
| Category: 微博客 | 1 |

Step (1-3): The co-occurrence frequency information in all Wikipedia pages is merged together to construct a link information database.

The co-occurrence frequency information (in descending order) of each title concept and its corresponding link concept and category link is merged to construct a Wikipedia link information database.

For example,

In the above example, the title concept is "微博", the link concepts are: [[Twitter]], [[网志|博客]], [[短讯]], [[即时消息软件]], [[行动应用程序]], [[电子邮件]], [[网页]], [[多媒体]], [[新浪微博]], [[Plurk]], and category links are: [[Category: 网志]], [[Category: 微博客]]. For title concept, link concepts and category links, we sort them in descending order and save them into Wikipedia link information database, as follows:

微博: (微博, 9), (网志, 5), (Twitter, 3), (短讯, 1), (即时消息软件, 1), (行动应用程序, 1), (电子邮件, 1), (网页, 1), (多媒体, 1), (新浪微博, 1), (Plurk, 1), (Category: 网志, 1), (Category: 微博客, 1)

Step (1-4): According to the link information database, for each title concept, link concept or category link, its total frequency is counted.

For each concept (including title concept and link concept) and category link in the Wikipedia link information database, its total frequency is counted.

The total frequency of each concept or category link can be obtained by summing up its all frequencies in Wikipedia link information database.

For example,

In the above example, the total frequencies are as follows: (微博, 25890), (网志, 1115), (Twitter, 18970), (短讯, 15263), (即时消息软件, 2156), (行动应 用程序, 489), (电子邮件, 11259), (网页, 23231), (多媒体, 11839), (新浪微博, 12433), (Plurk, 2341), (Category: 网志, 589), (Category: 微博客, 387).

Step (2): For the title concepts, according to their link relationships with link concepts or category links, the positive and negative training instances are constructed respectively, which constitute the training dataset.

The title concept of a Chinese Wikipedia page and a link concept or category link in the Wikipedia page, are combined together to form a positive training instance; the title concept of a Chinese Wikipedia page and a link concept or category link not in the Wikipedia page, are combined together to form a negative training instance; from the candidate training instances, a number of positive and negative instances are selected to constitute the training dataset, with two selection strategies, including: (1) selection based on the frequencies of concepts, and (2) random selection.

Step (2-1): The title concept of a Chinese Wikipedia page and a link concept or category link in the Wikipedia page, are combined together to form a positive training instance.

The construction of a positive training instance is as follows:

The title concept of a Chinese Wikipedia page and a link concept or category link in the Wikipedia page, are combined together to form a positive training instance, which can be represented as:

titleconcept, linkconcept, 1

Among the above representation, titleconcept means title concept, linkconcept means link concept or category link, 1 means a positive instance.

For example,

For the title concept "微博", if it is combined with its link concept "Twitter", we can obtain a positive instance, i.e., (微博, Twitter, 1).

Step (2-2): The title concept of a Chinese Wikipedia page and a link concept or category link not in the Wikipedia page, are combined together to form a negative training instance.

The construction of a negative training instance is as follows:

The title concept of a Chinese Wikipedia page and a link concept or category link not in the Wikipedia page, are combined together to form a negative training instance, which can be represented as:

titleconcept, non-linkconcept, 1

Among the above representation, titleconcept means title concept, non-linkconcept means link concept or category link which doesn't appear in the Wikipedia page of the title concept, 0 means a negative instance.

For example,

For the title concept "微博", if it is combined with a concept "无政府主义" which doesn't appear in the Wikipedia page of "微博", we can obtain a negative instance, i.e., (微博, 无政府主义, 0).

Step (2-3): The positive and negative training instances are merged together to form the candidate training dataset; from the candidate training dataset, a number of positive and negative instances are selected out according to two strategies: (1) selection based on the frequencies of concepts, and (2) random selection.

The detailed method for realizing the selection based on the frequencies of concepts is as follows:

According to the frequencies that link concepts or category links emerge in Wikipedia pages or corpus, their selection probabilities are computed; according to the selection probabilities, the training instances are chosen from the candidate training dataset.

The detailed method for realizing the random selection is to randomly choose instances from the candidate training dataset.

For the selection based on the frequencies of concepts, it tends to select the positive and negative instances that are corresponding to the link concepts or category links with top-k highest frequencies. However, for the random selection, it tends to select uniformly the link concepts or category links. Note: when selecting a negative instance, the selection strategy is required to not select the concept or category link that appears in the current Wikipedia page of the title concept.

For example, for the concept "微博", suppose that the number of positive and negative instances specified by the user is 5.

If the user utilizes the selection strategy based on the frequencies of concepts, the concept or category link with the highest frequency is preferred to be selected to construct positive or negative instances. For a positive instance, we first compute the selection probability of candidate concepts or category links, according to their occurrence frequencies in current Wikipedia page. As shown in Table 1, we know that (网志, 5), (Twitter, 3), (短讯, 1), (即时消息, 软件, 1), (行动应用程序, 1), (电子邮件, 1), (网页, 1), (多媒体, 1), (新浪微博, 1), (Plurk, 1), (Category: 网志, 1), (category: 微博客, 1), then, we can compute the selection probability as: 0.27, 0.16, 0.05, 0.05, 0.05, 0.05, 0.05, 0.05, 0.05, 0.05, 0.05, 0.05. According to the probability, 5 instances are sampled, which are supposed as: 网志, Twitter, 即时消息软件, 网志, Category: 微博客. Therefore, we can construct 5 positive instances, as follows:

微博, 网志, 1
微博, Twitter, 1
微博, 即时消息软件, 1
微博, 网志, 1
微博, Category: 微博客, 1

For a negative instance, according to the frequencies of concepts and category links in Step (1-4), the selection probabilities are compute with the method in Step (2-3); then, according to the probabilities, 5 instances are sampled, which are supposed as: 无政府主义, 毒品, 红酒, 山东大学, Category:Sports. Therefore, we can construct 5 negative instances, as follows:

微博, 无政府主义, 0
微博, 毒品, 0
微博, 红酒, 0
微博, 山东大学, 0
微博, Category:Sports, 0

If the user utilizes the random selection strategy, it means that the selection probability of each concept or category link is 1/N. Their probabilities are same. The other processing are completely same with that of the selection strategy based on the frequencies of concepts, which will not be described here.

Step (2-4): The training dataset is constructed with the selected instances in Step (2-3).

The positive and negative instances obtained in step (2-3) are merged together and randomly shuffled to form the final training dataset. Whether it is a positive instance or a negative one, it contains three dimensions, i.e., titleconcept, linkconcept or non-linkconcept, 0 or 1. Each dimension can be stored with a vector.

For example, we can use vector_titleconcept, vector_linkconcept, vector_posneg to represent the vectors corresponding to the three dimensions of the training dataset. Assuming that the total number of instances in the training dataset is trainsample_num, the dimension of each vector is trainsample_num×1.

Step (3): A concept embedding model is built, including an input layer, an embedding layer, a computational operation layer, and an output layer.

Step (3-1): According to the descending order of the frequencies of title concepts, link concepts and category links in Wikipedia corpus, all the concepts are encoded with an ID number.

According to the frequencies obtained in Step (1-4), the concepts and category links are sorted in descending order. The concept with the highest frequency is encoded as 1, the second highest concept is encoded as 2, and so on. With the method, all concepts and category links are encoded with an ID number.

Step (3-2): With the total number of title concepts, link concepts and category links as one dimension and the width length of a target concept embedding as another dimension, a two-axis matrix is constructed and initialized with the uniform distribution on [−1,1], which is the concept embedding matrix and is taken as weight matrix of the embedding layer in the concept embedding model.

Assuming that the dimension size of the concept vector specified by the user is embedding_dim, the total number of concepts and category links in Wikipedia is concept_num, then a two-axis matrix is constructed and initialized with the uniform distribution on [−1,1], whose dimensions are (concept_num+1)×embedding_dim. The matrix is used as the weight matrix of the embedding layer of the model, where each row is the concept vector of the corresponding encoded concept or category link. Note: the 0-th row corresponds to the concept that does not exist in the training dataset.

For example, in Keras, the codes for its implement is as follows:

embedding_matrix=np.random.uniform (−1,1, (concept_num+1, embedding_dim))
embedding_matrix[0,:]=0

Step (3-3): The concept embedding model consists of input layer, embedding layer, computational operation layer and output layer; the two concepts in each training instance are taken as the two input of the input layer; the embedding layer converts the two input concepts to their concept embedding representations; the computational operation layer does the concatenation, multiplication or other operations on the two concept embeddings, to generate an embedding representation for current training instance; according to the embedding representation of current training instance, the output layer classifies the current instance and judge whether it is positive or negative.

Step (3-3-1): define the input layer

There are two inputs for the input layer. One corresponds to tilteconept and another corresponds to linkconcept or non-linkconcept. Their shape is (1,), their dtype parameters is int32.

For example, in Keras, the codes for its implement is as follows:

input_titleconcept=Input(shape=(1,), dtype='int32', name='input_titleconcept')
input_linkconcept=Input(shape=(1,), dtype='int32', name='input_linkconcept')

In the above example, the shape of the input tensor is (?,1).

Step (3-3-2): define the embedding layer and get the concept embeddings of the inputs With the concept matrix defined in Step (3-2), the embedding layer is defined, whose input_dim parameter is concept_num+1, output dim parameter is embedding_dim, input_length parameter is 1, weights parameter is the concept matrix defined in Step (3-2), trainable parameter is True.

For example, in Keras, the codes for its implement is as follows:

embedding_layer= Embedding(concept_num+1,embedding_dim,weights[embedding_matrix],input_length=1,trainable=True, name='embedding_layer')

In the above example, the shape of the output tensor is (?, 1, embedding_dim). For the output tensor, the dimension of 1 is removed with the following codes:

embedded_titleconcept_vector=Lambda(lambda x: K.squeeze(x, axis=1))(embedded_titleconcept_vector)
embedded_linkconcept_vector=Lambda(lambda x: K.squeeze(x, axis=1))(embedded_linkconcept_vector)

In the above example, the shape of the output tensor is (?,embedding_dim).

Step (3-3-3): define computational operation layer

The computational operation layer does the concatenation, multiplication or other operations on the two concept embeddings, to generate an embedding representation for current training instance. In this layer, any complex computational operations could be applied. Here, the concatenation, multiplication, and averaging operations are taken as examples for explanation.

For example, in Keras, the concatenation operation is implemented as follows:

calc_vector=Lambda(lambda x: K.concatenate([x[0], x[1]], axis=1))([embedded_titleconcept_vector, embedded_linkconcept_vector])

In the above example, the shape of the output tensor is: (?, 2×embedding_dim)

For example, in Keras, the multiplication operation is implemented as follows:

calc_vector=multiply([embedded_titleconcept_vector, embedded_linkconcept_vector])

In the above example, the shape of the output tensor is: (?, embedding_dim)

For example, in Keras, the averaging operation is implemented as follows:

calc_vector=average([embedded_titleconcept_vector, embedded_linkconcept_vector])

In the above example, the shape of the output tensor is: (?, embedding_dim)

Step (3-3-4): define the output layer

The tensor outputted by Step (3-3-3) is connected with one output neuron with a dense layer, where sigmoid function is chosen as the activation function. For the input instance, i.e., titleconcept and linkconcept or non-linkconcept, the layer judges whether the instance is positive or negative.

For example, in Keras, the layer is implemented as follows:

preds=Dense(1, activation='sigmoid')(calc_vector)

In the above example, the shape of the output tensor is: (?, 1)

Step (3-3-5): define the model and compile it

The tensors of the two input concepts of the input layer in the Step (3-3-1) are used as the input of the model, and the predicted output in the Step (3-3-4) is used as the output of the model to define the model.

In order to compile the model, binary_crossentropy is used as the loss function, RMSprop is used as the optimization algorithm, and acc is used as the evaluation measure.

For example, in Keras, the model is implemented as follows:

model=Model(inputs=[input_titleconcept, input_linkconcept], outputs=preds)
model.compile(loss='binary_crossentropy', optimizer=RMSprop,metrics=['acc'])

Step (4): The concept embedding model is trained with the training dataset, then, the Chinese concept embedding is extracted/generated from the concept embedding model.

For example, in Keras, this step is implemented as follows:

model.fit([vector_titleconcept, vector_linkconcept], vector_posneg,batch_size=128,epochs=100,verbose=2)

In the above example, the batch_size is set as 128, epochs is set as 100.

In the concept embedding model, the weight parameters of embedding layer is the concept embedding matrix, whose rows are corresponding with the concepts. The n-th row in the matrix is the concept embedding of the concept with ID: n.

For example, in Keras, the weight parameters is extracted as follows:

weights=[layer.get_weights( ) for layer in model.layers iflayer.name=='embedding_layer']

weights is the matrix, where the n-th row is the concept embedding of the concept with ID: n.

For example, the first row is: [2.58952886e-01, −1.44168878e+00, 1.29486823e+00, −2.75119829e+00, 7.04625177e+00, 6.94709539e+00, 1.14686847e+00, −5.55342722e+00, 4.34897566e+00, 1.30873978e+00], then it is the embedding of the concept with ID:1, which is the most frequent concept in the corpus.

Embodiment 2

The second purpose of the present invention is to provide a computer readable storage medium.

In order to achieve the above object, the present invention adopts the following technical solution:

A computer readable storage medium stores a series of instructions. The instructions are loaded by a processor of a terminal device, which performs the following processing:

According to the title concepts and/or link concepts in the Chinese Wikipedia page, a link information database is constructed;

For the title concepts, according to their link relationships with link concepts in the link information database, the positive and negative training instances are constructed respectively, which constitute the training dataset;

A concept embedding model is built, including an input layer, an embedding layer, a computational operation layer, and an output layer;

The concept embedding model is trained with the training dataset, then, the Chinese concept embedding is extracted/generated from the concept embedding model.

Embodiment 3

The third purpose of the present invention is to provide a terminal device.

In order to achieve the above purpose, the present invention adopts the following technical solution, described as:

A terminal device is composed with a processor and a computer readable storage medium.

The processor is used to implement instructions. The computer readable storage medium is used to stores a series of instructions. The instructions are loaded by a processor of a terminal device, which performs the following processing:

According to the title concepts and/or link concepts in the Chinese Wikipedia page, a link information database is constructed;

For the title concepts, according to their link relationships with link concepts in the link information database, the positive and negative training instances are constructed respectively, which constitute the training dataset;

A concept embedding model is built, including an input layer, an embedding layer, a computational operation layer, and an output layer;

The concept embedding model is trained with the training dataset, then, the Chinese concept embedding is extracted/generated from the concept embedding model.

When these computer-executable instructions are executed in a device, the device performs the methods or processes described as various embodiments in the present invention disclosure.

In the present embodiment, the terminal device may include a computer readable storage medium, which stores computer readable program instructions for performing various operations in the present disclosure. The computer readable storage medium can be a tangible device that can store the instructions used by the execution terminal device. The computer readable storage medium can be, but not limited to, an electrical storage device, a magnetic storage device, an optical storage device, an electromagnetic storage device, a semiconductor storage device, or any suitable combination of the foregoing devices. More specific examples (non-exhaustive list) of computer readable storage media include: portable computer disks, hard disks, random access memory (RAM), read only memory (ROM), erasable programmable read only memory (EPROM) or flash memory), static random access memory (SRAM), portable compact disk read only memory (CD-ROM), digital versatile disk (DVD), memory stick, floppy disk, mechanical encoding device which stores the instructions with the hole card or groove, and any suitable combination of the foregoing devices. A computer readable storage medium as used herein is not to be interpreted as a transient signal itself, such as a radio wave or other freely propagating electromagnetic wave, an electromagnetic wave propagating through a waveguide or other transmission medium (eg, a light pulse through a fiber optic cable), or the electrical signal transmitted through a wire.

The computer readable program instructions described herein can be downloaded to a computing/processing device from a computer readable storage medium or downloaded to an external computer or external storage device over a network, such as the Internet, a local area network, a wide area network, and/or a wireless network. The network may include copper transmission cables, fiber optic transmissions, wireless transmissions, routers, firewalls, switches, gateway computers, and/or edge servers. A network adapter card or network interface in each computing/processing device receives computer readable program instructions from the network and forwards the computer readable program instructions to store them in the storage medium in each computing/processing device.

Computer program instructions for performing the operations of the present disclosure may be assembly instructions, instruction set architecture (ISA) instructions, machine instructions, machine related instructions, microcode, firmware instructions, state setting data, or any suitable combination of the foregoing instructions. Source code or object code may be written in any combination, including an object oriented programming language such as C++, and a conventional procedural programming language such as a "C" language or similar programming language. The computer readable program instructions can execute entirely or partly on the user's computer, as a stand-alone software package, partly on the user's computer and partly on the remote computer, or entirely on the remote computer/server. In the case of a remote computer, the remote computer can be connected to the user's computer through any kind of network, including a local area network (LAN) or wide area network (WAN), or can be connected to an external computer (eg, using an Internet service provider to access the Internet connection). In some embodiments, the electronic circuit may be customized, such as a programmable logic circuit, a field programmable gate array (FPGA), or a programmable logic array (PLA). Computer readable program instructions are executed to implement various aspects of the present disclosure.

It should be noted that although several modules or sub-modules of the device are mentioned in the above detailed description, such division is merely exemplary and not mandatory. In fact, in accordance with embodiments of the present disclosure, the features and functions of the two or more modules described above may be embodied in one module. Conversely, the features and functions of one of the modules described above may be further divided into multiple modules.

The beneficial effects of the invention are as follows:

1. The method and device for Chinese concept embedding generation based on Wikipedia link structure described in the present invention, can effectively pre-process Chinese Wikipedia corpus, extract concepts and their link relationships, and construct a link information database.

2. The method and device for Chinese concept embedding generation based on Wikipedia link structure described in the present invention, can handle the construction and selection of positive and negative training instances to generate training datasets. Besides, the invention defines and implements a complete model for training concept embedding, which can generate the final concept embedding representation.

3. The method and device for Chinese concept embedding generation based on Wikipedia link structure described in the present invention, can generate the final concept embedding with title concepts and/or link concepts in Chinese Wikipedia pages. It can accurately distinguish different concepts and overcome the problem of polysemy that troubles the traditional embedding methods, which is beneficial to generate more accurate concept embedding representation.

The above description is only the preferred embodiment of the present application, and is not intended to limit the present application. For the technicians in the field, various changes and modifications may be made to the present application. Any modifications, equivalent substitutions, improvements, etc. made within the spirit and principles of this application are intended to be included within the scope of the present application. Therefore, the present invention is not to be limited to the embodiments shown herein.

The invention claimed is:

1. The method for Chinese concept embedding generation based on Wikipedia link structure, comprising the following steps:

Step (1): According to the title concepts and/or link concepts in Chinese Wikipedia pages, a link information database is constructed;

Step (2): For the title concepts, according to their link relationships with link concepts in the link information database, the positive and negative training instances are constructed respectively, which constitute the training dataset;

Step (3): A concept embedding model is built, including an input layer, an embedding layer, a computational operation layer, and an output layer;

Step (4): The concept embedding model is trained with the training dataset, then, the Chinese concept embedding is extracted/generated from the concept embedding model;

Wherein the method is in the detailed method for constructing the positive and negative training instances as:

The title concept of a Chinese Wikipedia page and a link concept or category link in the Wikipedia page, are combined together to form a positive training instance;

The title concept of a Chinese Wikipedia page and a link concept or category link not in the Wikipedia page, are combined together to form a negative training instance;

Wherein the method is in the detailed method for building the concept embedding model as:

According to the descending order of the frequencies of title concepts, link concepts and category links in Wikipedia corpus, all the concepts are encoded with an ID number;

With the total number of title concepts, link concepts and category links as one dimension and the width length of a target concept embedding as another dimension, a two-axis matrix is constructed and initialized with the uniform distribution on [−1,1], which is the concept embedding matrix and is taken as weight matrix of the embedding layer in the concept embedding model;

The concept embedding model consists of input layer, embedding layer, computational operation layer and output layer; the two concepts in each training instance are taken as the two input of the input layer; the embedding layer converts the two input concepts to their concept embedding representations; the computational operation layer does the concatenation, multiplication or other operations on the two concept embeddings, to generate an embedding representation for current training instance; according to the embedding representation of current training instance, the output layer classifies the current instance and judge whether it is positive or negative.

2. The method of claim 1, wherein:

The link information database is constructed according to the description and category information combing the title concepts and/or link concepts in Chinese Wikipedia pages.

3. The method of claim 2, wherein constructing the link information database as:

An original Chinese Wikipedia page is pre-processed to only reserve its valid text data;

From the valid text data in a Wikipedia page, the co-occurrence frequencies of title concept with its link concepts or category links in current Wikipedia page are counted;

The co-occurrence frequency information in all Wikipedia pages is merged together to construct a link information database;

According to the link information database, for each title concept, link concept or category link, its total frequency is counted.

4. The method of claim 3, wherein pre-processing the original Chinese Wikipedia page as:

The invalid information in the original Chinese Wikipedia pages are filtered out to get the valid text data, only reserving the title concepts, the main descriptive text, link concepts and category links;

The traditional Chinese characters are converted to simplified Chinese characters.

5. The computer readable storage medium storing a series of instructions, wherein: the instructions are loaded by a processor of a terminal device, which performs the processes described in claim 4.

6. The terminal device is composed with a processor and a computer readable storage medium, where the processor is used to implement instructions, the computer readable storage medium is used to stores a series of instructions, which are loaded by a processor of a terminal device performing the processes described in claim 4.

7. The computer readable storage medium storing a series of instructions, wherein: the instructions are loaded by a processor of a terminal device, which performs the processes described in claim 3.

8. The terminal device is composed with a processor and a computer readable storage medium, where the processor is used to implement instructions, the computer readable storage medium is used to stores a series of instructions, which are loaded by a processor of a terminal device performing the processes described in claim 3.

9. The computer readable storage medium storing a series of instructions, wherein: the instructions are loaded by a processor of a terminal device, which performs the processes described in claim 2.

10. The terminal device is composed with a processor and a computer readable storage medium, where the processor is used to implement instructions, the computer readable storage medium is used to stores a series of instructions, which are loaded by a processor of a terminal device performing the processes described in claim 2.

11. The method of claim 1, wherein constructing the training dataset as:

The positive and negative training instances are merged together to form the candidate training dataset;

From the candidate training dataset, the methods to select a number of positive and negative instances, including two strategies: (1) selection based on the frequencies of concepts, and (2) random selection;

The order of selected instances are randomized to construct the training dataset.

12. The method of claim 11, wherein the detailed method for realizing the selection based on the frequencies of concepts as:

According to the frequencies that link concepts or category links emerge in Wikipedia pages or corpus, their selection probabilities are computed;

According to the selection probabilities, the training instances are chosen from the candidate training dataset.

13. The computer readable storage medium storing a series of instructions, wherein: the instructions are loaded by a processor of a terminal device, which performs the processes described in claim 12.

14. The terminal device is composed with a processor and a computer readable storage medium, where the processor is used to implement instructions, the computer readable storage medium is used to stores a series of instructions, which are loaded by a processor of a terminal device performing the processes described in claim 12.

15. The computer readable storage medium storing a series of instructions, wherein: the instructions are loaded by a processor of a terminal device, which performs the processes described in claim 11.

16. The terminal device is composed with a processor and a computer readable storage medium, where the processor is used to implement instructions, the computer readable storage medium is used to stores a series of instructions, which are loaded by a processor of a terminal device performing the processes described in claim 11.

17. The computer readable storage medium storing a series of instructions, wherein: the instructions are loaded by a processor of a terminal device, which performs the processes described in claim 1.

18. The terminal device is composed with a processor and a computer readable storage medium, where the processor is used to implement instructions, the computer readable storage medium is used to stores a series of instructions, which are loaded by a processor of a terminal device performing the processes described in claim 1.

* * * * *